United States Patent [19]

Lenoir, III

[11] Patent Number: 4,818,888
[45] Date of Patent: Apr. 4, 1989

[54] WATER-POWERED ELECTRICITY GENERATING APPARATUS

[76] Inventor: James L. Lenoir, III, 29 Farnham Pl., Metairie, La. 70005

[21] Appl. No.: 110,441

[22] Filed: Oct. 20, 1987

[51] Int. Cl.$^4$ .............................................. F03B 13/12
[52] U.S. Cl. ...................................... 290/43; 290/44; 290/53; 290/54; 290/55; 416/118
[58] Field of Search ...................... 290/42, 43, 44, 45, 290/52, 53, 54, 55, 1 R; 416/7-15, 32, 41 R, 41 A, 119, 132 B; 417/330-334; 415/1-7; 60/495-507

[56] References Cited

U.S. PATENT DOCUMENTS

| | | | |
|---|---|---|---|
| 3,442,492 | 5/1969 | Sullivan | 416/118 X |
| 4,001,596 | 1/1977 | Kurtzbein | 290/53 |
| 4,095,422 | 6/1978 | Kurakake | 290/54 X |
| 4,142,822 | 3/1979 | Herbert et al. | 290/55 X |
| 4,496,848 | 1/1985 | Binder | 290/55 |
| 4,508,972 | 4/1985 | Willmouth | 290/54 X |
| 4,516,033 | 5/1985 | Olson | 290/54 |
| 4,609,827 | 9/1986 | Nepple | 290/44 |

*Primary Examiner*—William M. Shoop, Jr.
*Assistant Examiner*—Paul Ip
*Attorney, Agent, or Firm*—Pravel, Gambrell, Hewitt, Kimball & Krieger

[57] ABSTRACT

Water-powered electricity generating apparatus, for use in rivers and other bodies of water having current flow therein, comprises a water wheel and an adjacent platform. The water wheel has a number of blades which are pivotally attached adjacent a first end thereof to vertical rods which extend between the top and bottom of the water wheel. A controllable stop, movable between an upper position in which it may contact a second end of the blade, and a lower position in which contact with the blade is not possible, is provided for each blade. The wheel also comprises a drive gear having downwardly-facing teeth. The drive gear meshes with gears of dynamos carried on the platform adjacent the water wheel.

The apparatus is placed in a river or other body of water having current therein. When traveling in an upstream direction, the blades swing freely parallel to the current. When traveling in a downstream direction, the second ends of the blades rest against the stops, and the blade presents a surface against which the current acts to turn the wheel. The wheel, powered by the blades in contact with the stops, and unhindered by the other blades, rotates continuously in one direction. Rotation of the wheel causes the drive gear to rotate, which causes the dynamo gears to rotate causing the dynamos to produce electricity.

15 Claims, 7 Drawing Sheets

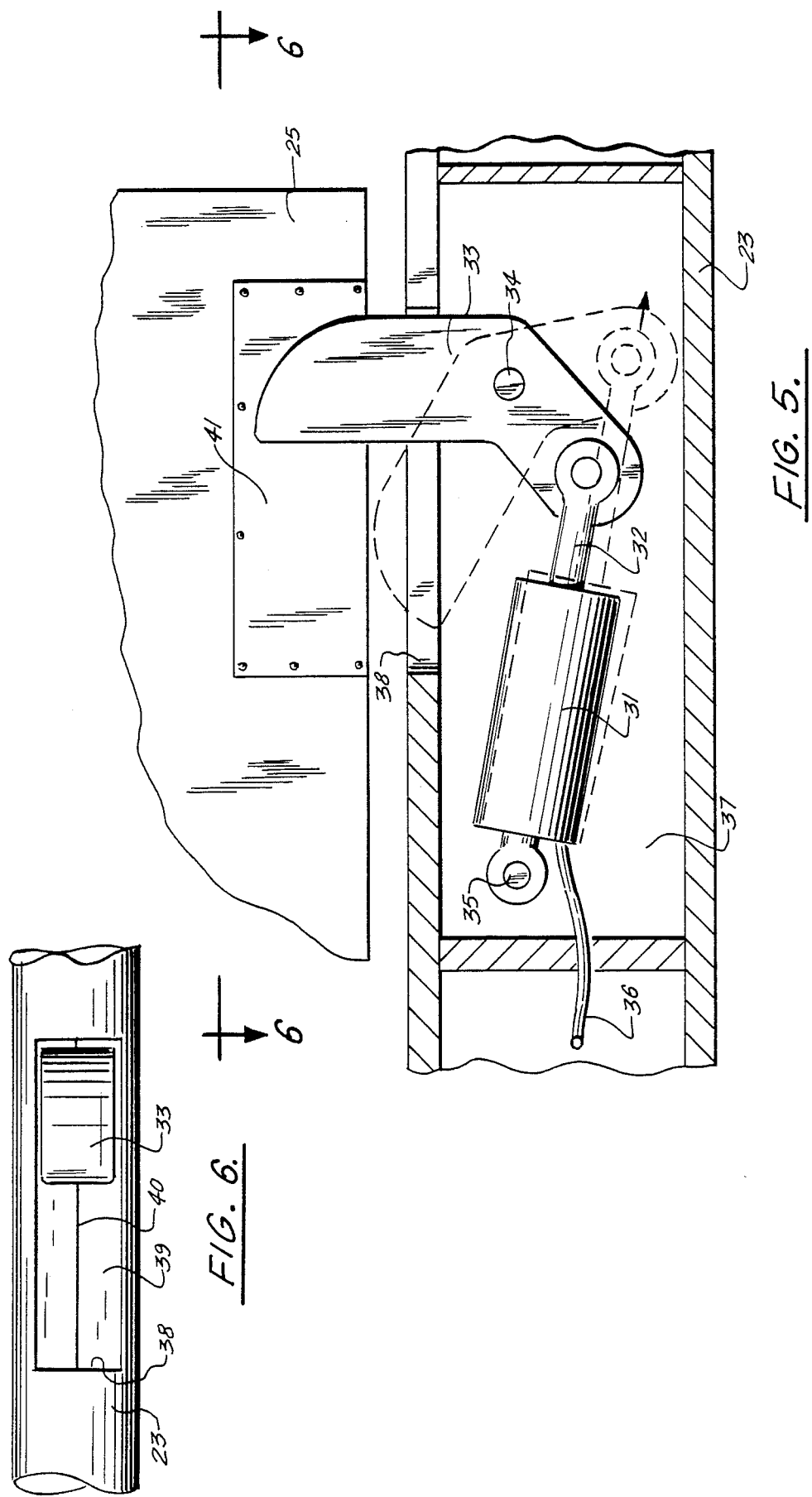

WATER-POWERED ELECTRICITY GENERATING APPARATUS

BACKGROUND OF THE INVENTION

1. Field of the Invention

The present invention relates generally to electricity generating apparatus, and more particularly to water-powered electricity generating apparatus.

2. General Background

Running water has long been used to power machinery, and more recently to generate electricity. The majority, if not all, of the electricity produced by running water is produced by high efficiency hydro-electric power plants located in dams. Due to ecological, economical, and/or topological factors, there are relatively few sites that are suitable for dam construction. There are, however, numerous rivers which have sufficient current to produce commercial quantities of electricity, if they can be properly tapped.

There have been various proposals in the past to tap the energy available in river current without the use of dams. To the knowledge of the inventor of the present invention, none of these proposals has been successfully put to use to produce energy in commercial quantities.

One such proposal is described in U.S. Pat. No. 848,522, which discloses a water wheel having a vertical hub from which a number of arms radiate outwardly. One set of arms is positioned adjacent an upper end of the hub, and a second set of arms is positioned adjacent a lower end of the hub, each arm of the upper set being connected to an arm of the lower set with a number of vertical rods. The rods support vertically-oriented blades which are rotatably attached thereto adjacent a first end of the blades. The water wheel is submerged in a river, and the current in the river acts upon the blades. On a first side of the wheel, the current causes the blades to align parallel to the flow of the current. On the second side, the blades are forced into contact with the stops, and provide a surface against which the current acts to rotate the wheel. As the wheel turns past the point at which the rod and stop are aligned parallel to the flow of the current, with the rod downstream from the stop, the current acts on the back face of the blade, causing it to swing 180° to a position in which it is free from the stop and is aligned parallel to the current flow. The blade remains aligned parallel to the current flow until the wheel turns such that the stop and the rod are aligned parallel to the flow of the current, with the rod upstream of the stop. At this point, the blade contacts the stop, and the current acts on the blade to turn the wheel. Thus, each blade spends half of the time in contact with the stop, causing the wheel to turn, and half of the time aligned parallel to the direction of flow of the current, presenting little resistance to the turning of the wheel. The wheel, powered by the blades in contact with the stops, and unhindered by the other blades, rotates continuously in one direction.

When it is desired to stop the rotation of the wheel, a ring is lowered. Lowering of the ring causes the stops to move into a position in which they do not contact the blades, so all blades align parallel to the direction of the flow of the current. Since there are then no blades against which the current can act, the wheel stops rotating.

U.S. Pat. No. 950,676 discloses a device for harnessing energy of a river, the device comprising a number of water wheels similar to that disclosed in U.S. Pat. No. 848,522. The devices are aligned in two rows parallel to the direction of flow of the current. Each wheel has a rotating gear adjacent an upper end thereof. There is a rotary shaft adjacent each row of wheels, each shaft having a gear adjacent each wheel in the row adjacent it. Each wheel mechanically communicates with one of the shafts via a rod having a gear on each end thereof. The teeth of the rotating gears face upward, and the gears of the rods are disposed above the gears of the wheels. Since the gears of the rods are disposed above the gears of the wheels, if one needs to remove the wheels to service them, the rods must first be removed.

SUMMARY OF THE PRESENT INVENTION

The present invention comprises a water-powered electricity generating apparatus, including a water wheel, for use in rivers and other bodies of water having current flow therein. The apparatus of the present invention comprises a water wheel and an adjacent platform. The water wheel has a number of blades which are pivotally attached adjacent a first end thereof to vertical rods which extend between the top and bottom of the water wheel. A controllable blade stop, movable between an extended position in which it may contact a second end of the blade, and a retracted position in which contact with the blade is not possible, is provided for each blade. The wheel also comprises a drive gear. The drive gear meshes with gears of dynamos carried on the platform adjacent the water wheel.

The apparatus is placed in a river or other body of water having current therein. When traveling in an upstream direction, the blades swing freely parallel to the current. When traveling in a downstream direction, the second ends of the blades rest against the blade stops, and the blade presents a surface against which the current acts to turn the wheel. The wheel, powered by the blades in contact with the stops and unhindered by the other blades, rotates continuously in one direction. Rotation of the wheel causes the drive gear to rotate, which causes the dynamo gears to rotate causing the dynamos to produce electricity.

The apparatus comprises means for facilitating removal of the water wheel from the body of water including downwardly-facing gear teeth on the drive gear such that the wheel may be lifted out of the body of water without first removing the dynamos. The apparatus also comprises a wheel-raising means.

The blades and framework of the wheel are preferably made hollow to make the wheel lighter and more buoyant to facilitate removal of the wheel from the water.

A debris diverter comprising, for example, a net attached to piles, is preferably placed upstream of the water wheel and platform to help prevent debris from interfering with the operation of the water wheel.

In a first embodiment of the present invention the water wheel is surrounded by the platform. The vertical rods upon which the blades are pivotally attached are positioned near the exterior of the wheel. When the blade stops are in the retracted position out of contact with the blades, the blades on the downstream side of the wheel project past the drive gear. To facilitate removal of the wheel from the body of water, the platform does not completely surround the wheel, rather its downstream ends terminate before the area where the blades project beyond the drive gear. Thus, when the wheel is pulled from the body of water, the movement of the blades through a plane parallel to the plane of the platform is unimpeded. Removal of the wheel from the body of water may therefore be effected without first removing either the platform or the dynamos.

In a second embodiment of the present invention, the platform completely surrounds the wheel. To facilitate the movement of the wheel, in place of each rod with an attached blade of the first embodiment there is a plurality of rods in a line, each having a relatively short blade pivotally attached thereto. The blades are shorter than the blades of the first embodiment, and are of a length such that they do not project past the drive gear when the stops are retracted. Thus, the water wheel can be removed from the water without first removing either the platform or the dynamos.

In a third embodiment of the present invention the platform is in the center, and the wheel rotates around it. The vertical rods to which the blades are attached are located adjacent the exterior of the wheel. The blades extend beyond the extent of the water wheel on the downstream side of the wheel but, since the platform does not surrounded, but rather is surround by the wheel, the wheel may be removed from the water without the blades contacting the platform or dynamos on the way out.

It is an object of the present invention to provide a water-powered electricity generating apparatus comprising a water wheel;

It is a further object of the present invention to provide a water-powered electricity generating apparatus comprising a water wheel having a plurality of vertically-disposed blades;

It is a further object of the present invention to provide a water-powered electricity generating apparatus comprising a water wheel and means for facilitating removal of the water wheel from a body of water;

It is still a further object of the present invention to provide a water-powered electricity generating apparatus comprising a water wheel and having means to divert debris away from the water wheel;

It is still a further object of the present invention to provide a water-powered electricity generating apparatus comprising a water wheel and having a water wheel raising means.

BRIEF DESCRIPTION OF THE DRAWINGS

For a further understanding of the nature, objects and advantages of the present invention, reference should be had to the following detailed description, taken in conjunction with the accompanying drawings, in which like reference numerals denote elements, and wherein:

FIGS. 5 and 6 are details of a blade control device in accordance with the present invention;

DETAILED DESCRIPTION OF THE PREFERRED EMBODIMENT

Figure 1:
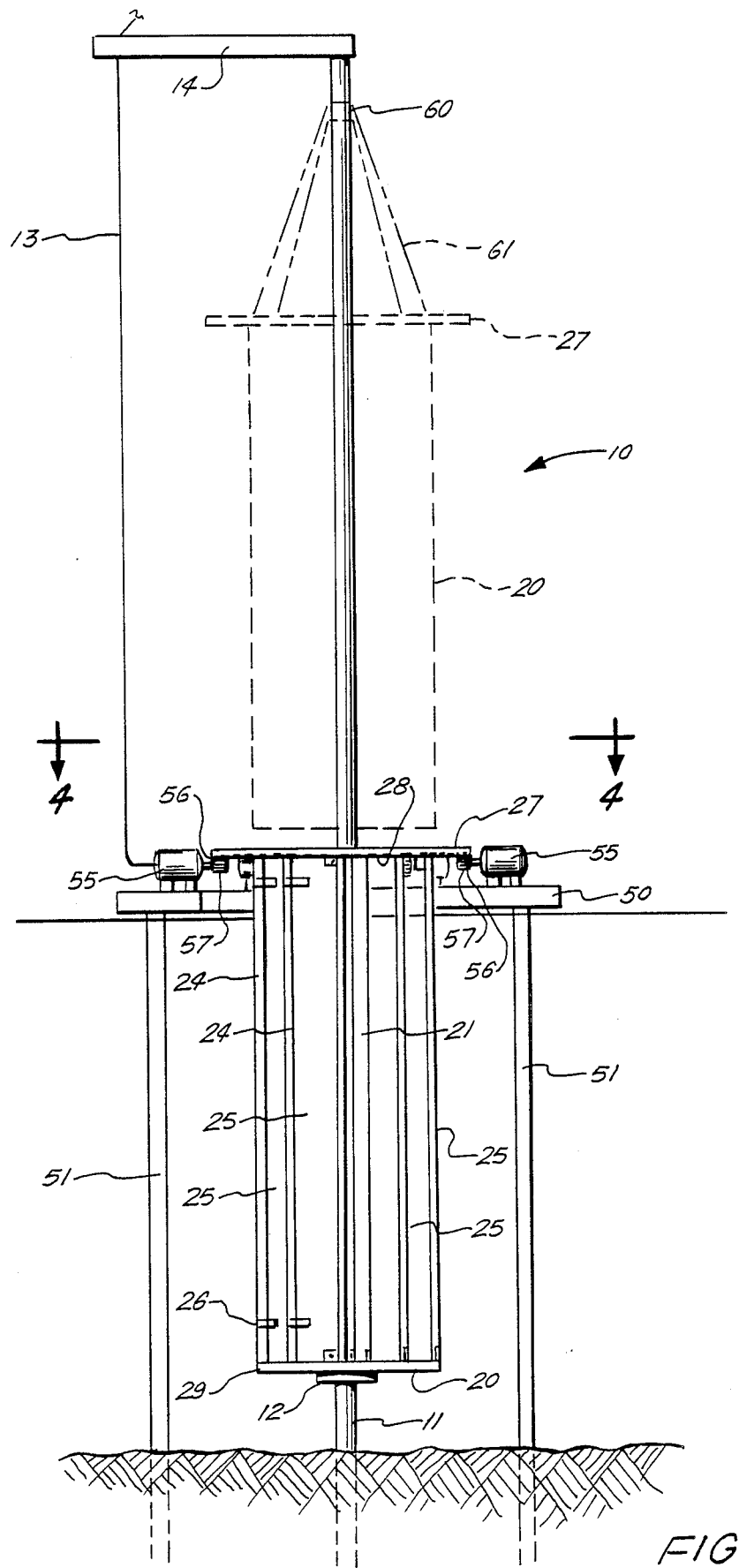
FIG. 1 is a front, elevational view of the preferred embodiment of the present invention.
Figure 2:
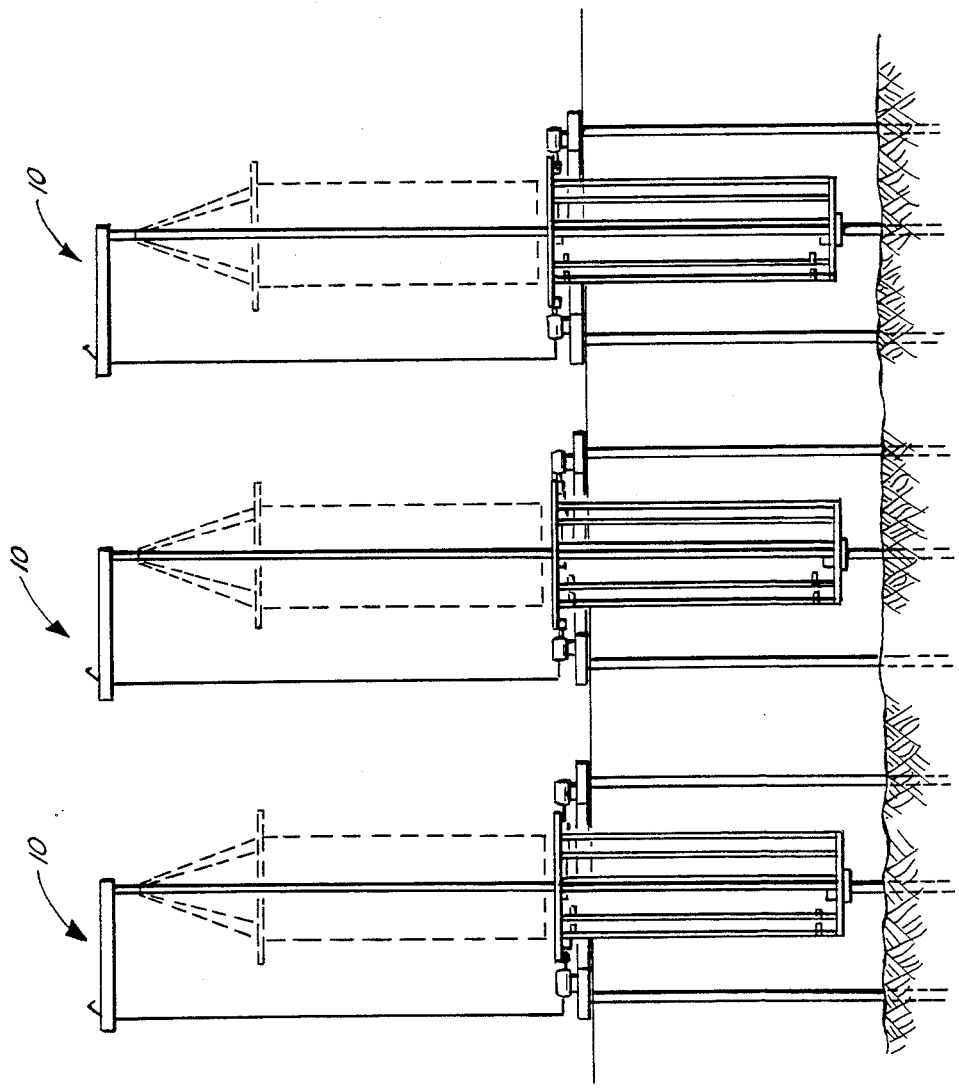
FIG. 2 is a front, elevational view of a plurality of apparatus of the preferred embodiment of the present invention.

Water-powered electricity generating apparatus 10 (FIG. 1), comprises a water wheel 20 and a platform 50.

Water wheel 20 (FIG. 3), comprises a hub 21 from which a plurality of arms 22 radiate outwardly adjacent the upper end thereof. A first end of each upper arm 22 is fixedly attached to hub 21, and a second end is fixedly attached to a drive gear 27. Drive gear 27 comprises a plurality of downwardly-facing gear teeth 28, the purpose of which will be described hereinafter. A plurality of arms 23 radiate outwardly adjacent a lower end of hub 21. A first end of each lower arm 23 is fixedly attached to hub 21, and a second end of each lower arm 23 is fixedly attached to a ring 29. Ring 29 is smaller in diameter than drive gear 27. The purpose of this difference in diameter will become apparent when the operation of the apparatus is described. Rods 24 are parallel to hub 21, and each rod 24 interconnects an upper arm 22 with a corresponding lower arm 23. A blade 25 is attached adjacent a first end thereof to each rod 24 with a plurality of watertight thrust bearings 26. Watertight thrust bearings 26 allow blades 25 to rotate freely about rods 24.

A hydraulically-operated blade control device 30 (see FIG. 5), is disposed in a grease-filled compartment 37 in each lower arm 23 adjacent a second end of a blade 25. Device 30 comprises a cylinder 31, a control arm 32 which is connected at a first end thereof to a piston (not shown), contained in cylinder 31, and is pivotally connected at a second end thereof to a blade stop 33. Blade stop 33 is pivotally mounted on a pin 34 which itself is fixedly attached to lower arm 23. Stop 33 is rotatable on pin 34 between a position in which it prevents blade 25 from swinging over lower arm 23 (shown in FIG. 5), to a position in which blade 25 may freely swing over arm 23 (shown in phantom in FIG. 5). Cylinder 31, as shown in FIG. 5, is pivotally mounted on a pin 35, which is fixedly attached to arm 23. A hydraulic line 36 connects cylinder 31 to a source of hydraulic fluid (not shown). Stop 33 extends out of grease-filled compartment 37 through an opening 38 (see FIG. 6). Opening 38 is covered with a rubber shield 39 having a slit 40 therein. Rubber shield 39 closes around stop 33 to prevent grease from escaping and water from entering compartment 37.

A blade control device 30 is also disposed in each upper arm 22. If the blade control devices 30 were present only in the upper arms 22 or only in the lower arms 23, blades 25 might have a tendency to twist when they contacted the blade stops 33. However, it would be possible to make a wheel 20 having a single blade control device 30 per blade 25.

Hub 21 has suitable bearings (not shown), to allow it to rotate freely about central pile 11 and to move vertically along pile 11. A roller bearing assembly 12 is fixedly attached to central pile 11. Roller bearing assembly 12 has a plurality of rollers thereon which contact the lower end of hub 21. Roller bearing assembly 12 serves to limit the downward vertical positioning of hub 21 relative to pile 11 for a purpose which will be described below.

Blades 25 are arcuate in plan, as can be seen in the drawings. The curved surface of blades 25 serve to present a concave surface against which the current acts to turn wheel 20. Blades 25 are preferably hollow, both to make them lighter when being transported and to make them buoyant when in the water to facilitate withdrawing wheel 20 from the water for servicing, as will be described further. Each blade 25 is reinforced in areas 41 where blade stops 33 contact it.

Platform 50 partially surrounds water wheel 20. Platform 50 is supported by three piles 51. As can be seen in the drawings, platform 50 does not extend completely around water wheel 20. The reason for this will become apparent hereinafter. Platform 50 supports a plurality of dynamos 55. Each dynamo 55 has a gear 56 with teeth 57 which mesh with teeth 28 of drive gear 27 of water wheel 20.

Multi-strand, multiple block and tackles 60 are mounted adjacent the top of pile 11, and are used when it is necessary to withdraw water wheel 20 from the river for servicing.

A floating debris diverter 65 (see FIG. 4), is positioned upstream of water wheel 20 and platform 50. Debris diverter 65 comprises a plurality of piles 66, one of which is set slightly further upstream of the others. A net or screen 67 extending above the high water level of the river is supported by piles 66. Net or screen 67 diverts floating debris away from water wheel 20, helping to ensure that the operation of wheel 20 will not be impeded by debris in the river. Floats 68 help to keep the top of net 67 above water level and also warn boats that net 67 is in the water.

Figure 4:
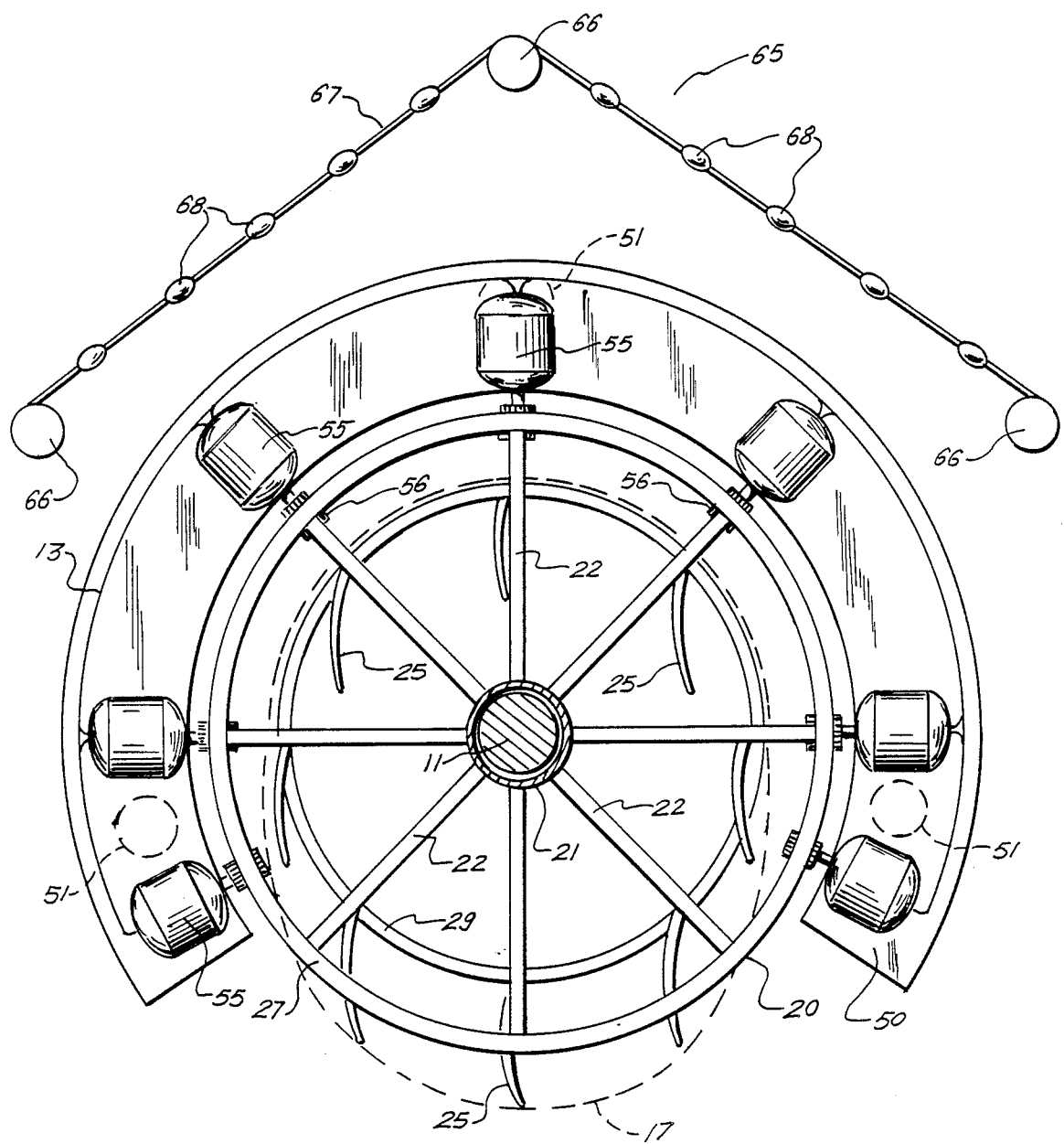
FIG. 4 is a plan view of the apparatus of the preferred embodiment of the present invention with the water wheel not rotating.

In operation, piles 11 and 51 are installed in the river, platform 50 is installed on piles 51, and dynamos 55 are mounted on platform 50. Roller bearing assembly 12 is mounted on pile 11 at a position where it supports wheel 20 such that drive gear 27 of wheel 20 meshes with gears 56 of dynamos 55. Wheel 20 is lowered onto roller bearing assembly 12. Blade stops 33 are preferably in the retracted position (the position shown in dashed-lines in FIG. 5), such that they do not contact blades 25, blades 25 are free to align parallel to the direction of the current (as shown in FIG. 4), and water wheel 20 does not rotate as it is lowered into the river. Debris diverter 65 may be installed after, but is preferably installed before, water wheel 20 is installed.

Figure 3:
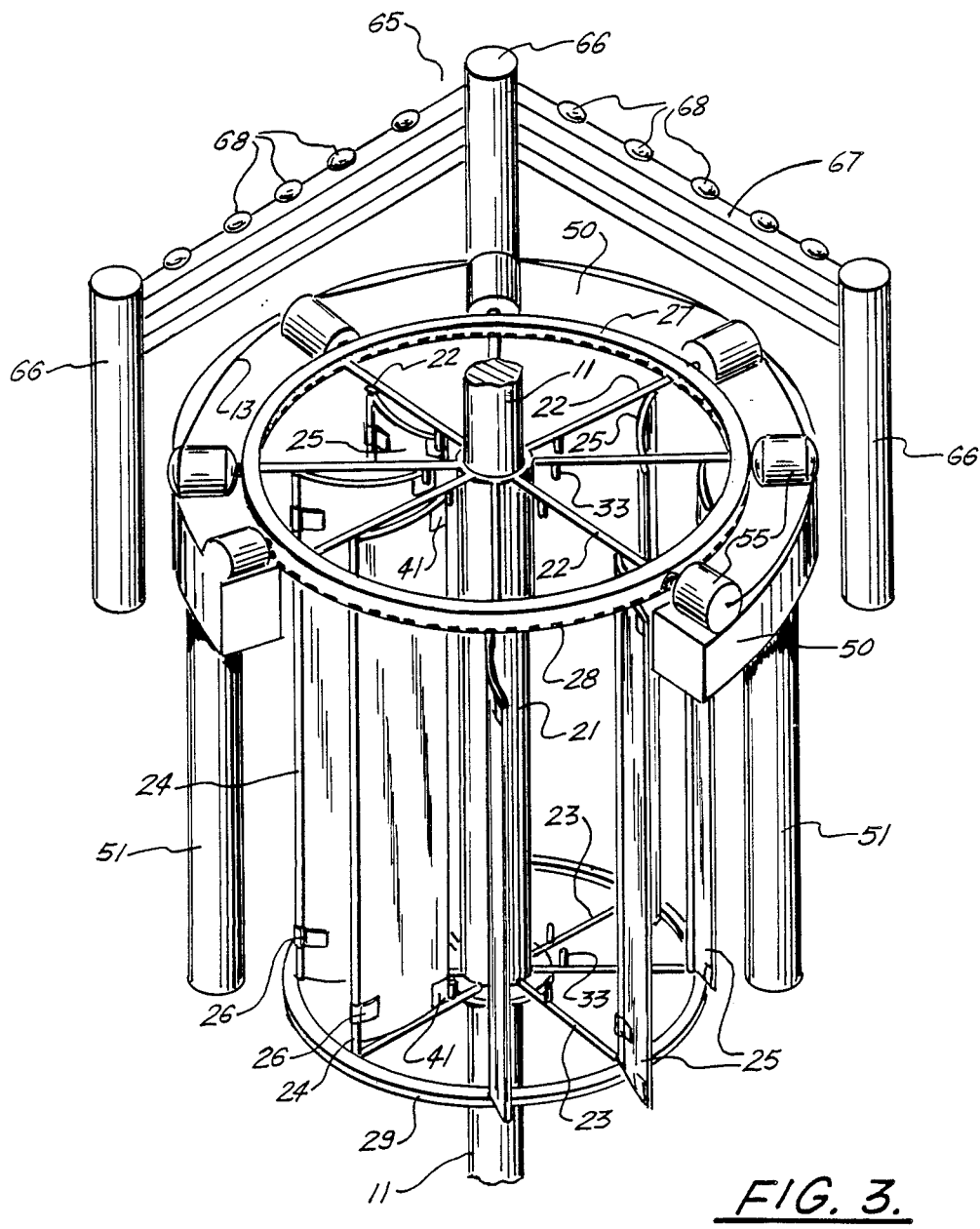
FIG. 3 is a perspective view of a portion of the apparatus of the preferred embodiment of the present invention.

Once all the apparatus 10 is installed as shown in FIG. 1, hydraulically-operated blade control devices 30 are activated to extend blade stops 33 to the position shown in FIG. 5. Once one of the blades 25 contacts one of the blade stops 33, the current in the river causes wheel 20 to continue to turn by exerting force against the blade 25 which is in contact with one of the blade stops 33. More blades 25 come into contact with more stops 33, until blades 25 of wheel 20 are positioned as shown in FIG. 3. In FIG. 3, the blades 25 which are shown traveling in a downstream direction are in contact with stops 33 and are causing wheel 20 to turn, while the blades 25 which are traveling in an upstream direction rotate freely, staying parallel to the direction of flow of the current. At the point at which blades 25 begin moving in an upstream direction, blades 25 swing from a position in which they contact stops 33 to a position in which they rotate freely on rods 24. Since the front concave faces of blades 25 are worked against by the river only when blades 25 are moving downstream, water wheel 20 rotates constantly in a single direction.

As wheel 20 rotates, drive gear 27, which meshes with gears 56 of dynamos 55, also rotates, causing dynamo gears 56 to rotate. The rotation of dynamo gears 56 causes dynamos 55 to produce electricity, which is preferably transmitted to shore via wires 13. Wires 13 travel from dynamos 55 to wire support bar 14 positioned atop pile 11, and thence to shore. The number of dynamos is not critical, and more or fewer than the number shown in the drawings may be used.

When it is necessary to withdraw water wheel 20 from the river, hydraulically-operated blade control device 30 is activated to retract stops 33 to the position shown in phantom in FIG. 5. To activate hydraulic blade control devices 30, one steps onto water wheel 20 (it does not move very quickly in most rivers), and manipulates the devices 30 with controls (not shown), located on water wheel 20. With stops 33 retracted, all blades 25 are allowed to swing free in the current and align themselves parallel to the flow of the current (see FIG. 4). With blades 25 aligned parallel to the current, the current can not work against the faces of blades 25, so water wheel stops rotating. Strands 61 are attached to water wheel 20 with, for example, hooks (not shown), on upper arms 22 between drive gear 27 and rods 24. Multi-strand, multiple block and tackles 60 are then activated (e.g., electrically) to pull water wheel 20 to the position shown in phantom in FIG. 1.

It is necessary to construct the apparatus such that the water wheel may be withdrawn from the river without the platform 50 or dynamos 55 interfering with the movement of blades 25. In the preferred embodiment of the present invention, platform 50 is constructed and dynamos 55 are mounted such that neither platform 50 nor dynamos 55 intersect (in plan) the area bounded by dashed oval 17 (see FIG. 4). Dashed oval 17 represents the farthest distance that a portion of a blade 25 will be, at a given point, from the center of pile 11. As can be seen in FIG. 4, this is accomplished by not extending arcuate platform 50 completely around water wheel 20, but instead terminating it on its downstream sides before it intersects oval 17.

Figure 7:
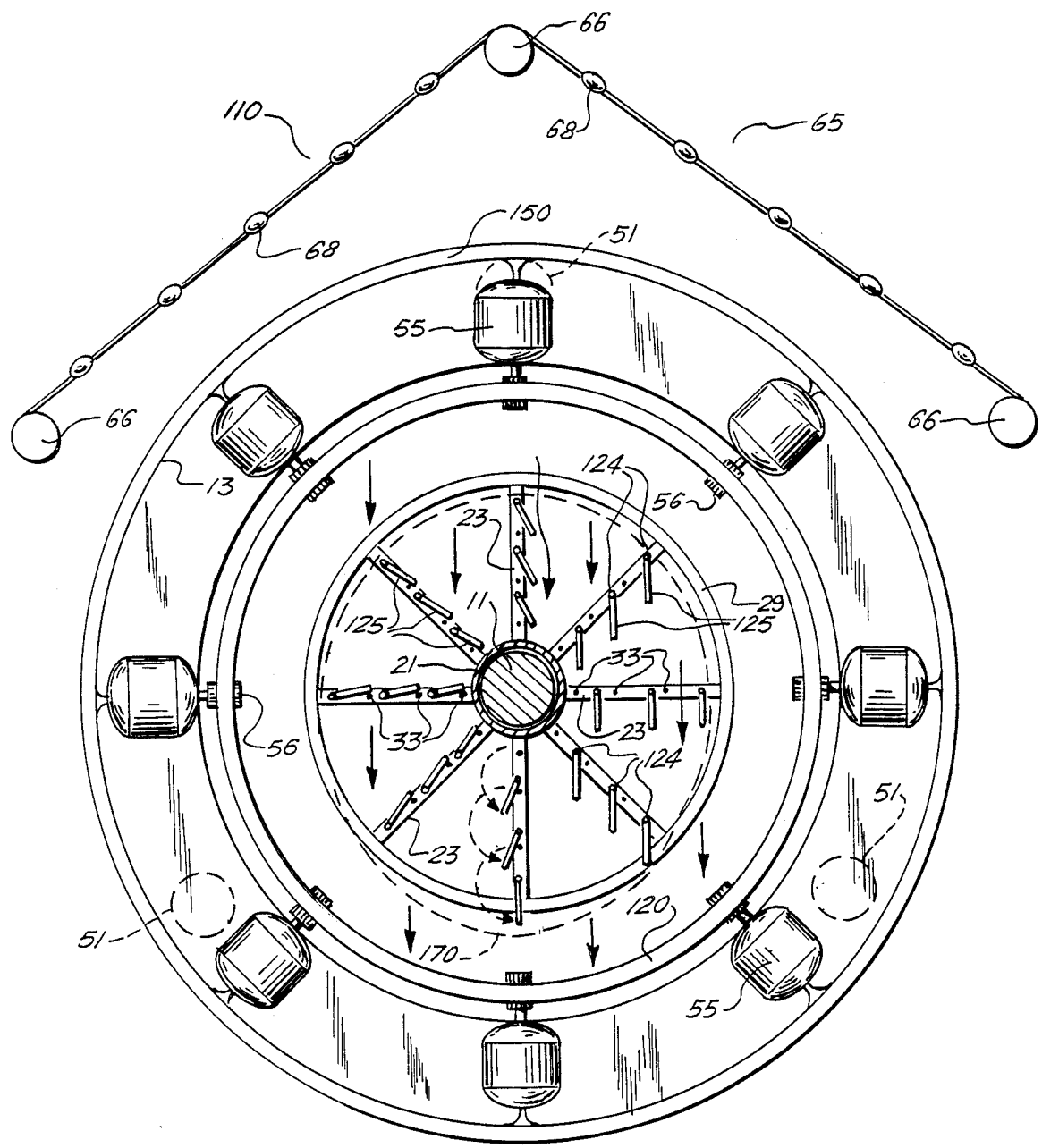
FIG. 7 is a plan view of an apparatus in accordance with a second embodiment of the present invention.
Figure 8:
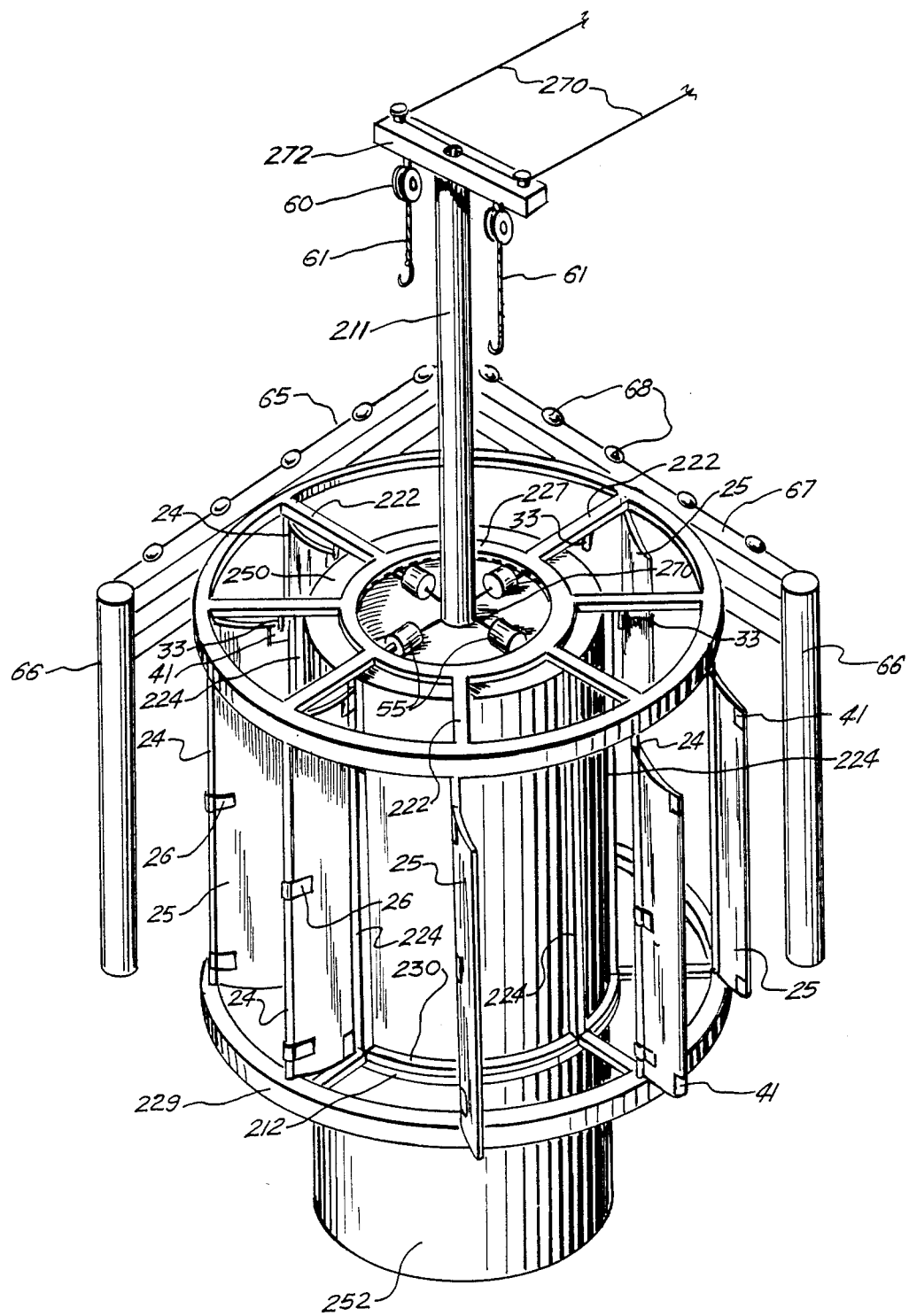
FIG. 8 is a perspective view of an apparatus in accordance with a third embodiment of the present invention.

A second embodiment of the present invention, a water-powered electricity generating apparatus 110, is shown in FIG. 8. Apparatus 110 differs from apparatus 10, among other things, in that there are a plurality of blades 125 between each lower arm 23 and its corresponding upper arm 22 (upper arms 22 are omitted in FIG. 7 for clarity, and are the same as arms 22 of water wheel 20). Blades 125 are connected to rods 124 in the same manner in which blades 25 are connected to rods 24. By using a plurality of blades 125 between each arm 22 and its corresponding arm 23, one can minimize the farthest distance which a portion of a blade extends away from the center of water wheel 120 for a given effective surface area of the blades. Compare, for example, the effective surface area of the blades 125 between each upper arm 22 and its corresponding lower arm 23 in FIG. 7 with the effective surface area of each blade 25 shown in FIG. 4. The effective surface areas are approximately equal, yet in FIG. 7 the farthest distance which a portion of a blade extends from the center of water wheel 120 when stops 33 are in the down position (indicated by dotted oval 170 in FIG. 7), is not even as far as drive gear 27 is from the center of water wheel 120. Thus, in apparatus 110, even though platform 150 extends completely around water wheel 120, blades 125 will not contact platform 150 as wheel 120 is withdrawn from the river.

Since platform 150 extends completely around water wheel 120, its proper orientation in water is not (unlike platform 50) dependent upon the prevailing current in the river. Apparatus 110 can thus be used where the current is not constant in direction, such as, for example, in rivers affected by tides. In such a case, debris diverter net 67 would preferably extend completely around platform 150.

A third embodiment of the present invention, water-powered electricity generating apparatus 210, is shown in FIG. 8.

Apparatus 210 is similar to apparatus 10 and 110, but in apparatus 210 platform 250 is surrounded by water wheel 220. Platform 250 is mounted on piles 251 (see FIG. 8). A cylindrical skirt 252 preferably made of a corrosion-resistant material, such as stainless steel or aluminum, surrounds piles 251, extending from the bed of the river to platform 250. Pile 211 extends above the platform to a height at least equal to the height of wheel 220, so that multiple, multi-strand block and tackles 60 can draw wheel 220 completely out of the river when servicing of wheel 220 is necessary. Pile 211 is hollow to allow electricity-transmitting wires 270 to travel from dynamos 55 up to crossbar 272 from which they are strung to the shore. Water wheel 220 includes a drive gear 227 having a plurality of downwardly-facing gear teeth 228. Radially extending outwardly from drive gear 227 are a plurality of arms 222, each of which is fixedly attached at a first end thereof to drive gear 227 and at a second end thereof to upper outer ring 231. Rods 24 connect upper, outer ring 231 to lower, outer ring 229. An inner rod 224 connects each upper arm 222 to lower inner ring 230. A roller bearing assembly 212 is fixedly attached to cylinder 252 at a position such that it maintains wheel 220 in a position where drive gear 227 meshes with but does not bear down on dynamo gears 56. Roller bearing assembly 212 has a plurality of rollers thereon which contact the lower end of ring 230. Lower inner ring 230 rides on roller bearing assembly 212. Lower inner ring 230 has suitable bearings (not shown), to allow it to rotate freely about cylinder 252 and to move vertically along cylinder 252.

In operation, after platform 250 and dynamos 55 have been installed, blade stops 33 are retracted, allowing blades 25 to swing freely and multiple, multi-strand block and tackles 60 are used to lower wheel 220 into the river until ring 230 rests on roller bearing assembly 212 and drive gear 227 meshes with dynamo gears 56. Hydraulically-operated blade control device 30 is then activated to extend stops 33 to the position shown in FIG. 6. Water wheel 220 is then caused to rotate in the same manner as wheel 20 is caused to rotate. As wheel 220 rotates, drive gear 227, which meshes with gears 56 of dynamos 55, also rotates, causing dynamo gears 56 to rotate. The rotation of dynamo gears 56 causes dynamos 55 to produce electricity which is transmitted to shore via electricity-transmitting wires 270.

Wheel 220 is removed from the river in the same manner as are wheels 20 and 120. All platforms and water wheels described herein are preferably made of stainless steel or some other corrosion-resistant material. All arms, rods, blades, and rings of the water wheels are preferably hollow to minimize the weight of the water wheels and to make them as buoyant as possible in the water. The piles may be made of metal, wood, or concrete. The net or screens for the debris diverter can be made of, for example, metal cables.

In deeper bodies of water, arms can be added intermediate upper arms 22 and lower arms 23, and each blade 25 or 125 extending from arm 22 to arm 23 would be replaced by two or more vertically-aligned blades, depending upon how many sets of arms are added intermediate upper arms 22 and lower arms 23. By replacing each blade with two or more vertically-aligned blades, the size and weight of the individual blades can be reduced, making them easier to handle during construction of the water wheel 20.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as the invention is:

1. A water-powered electricity generating apparatus comprising:
   a. a central plate form having a plurality of electricity-generating devices thereon;
   b. a water wheel coaxially aligned with and adjacent to the central platform, and having a plurality of blades;
   c. a plurality of stops which are movable between a position where contact with the blades is possible to a position where contact with the blades is not possible;
   d. a drive gear fixedly attached to the water wheel; and
   e. downwardly-facing gear teeth mounted on the drive gear for facilitating the removal of th®water from the water in the upward direction.

2. The apparatus of claim I, wherein the platform is coaxial with and positioned adjacent the exterior of the water wheel, and the means for facilitating the removal of the water wheel from the water comprises:
   an opening in the platform of sufficient size to allow the blades to vertically pass through a plane parallel to the platform when the stops are not engaged with the blades, and
   downwardly-facing teeth on the drive gear, such that the water wheel can be removed from the water without removing the platform or electricity-generating devices.

3. A water-powered electricity generating apparatus, comprising:
   a. a water wheel comprising:
      i. a hub having a set of upper arms and a set of lower arms radiating outwardly therefrom, the set of upper arms being disposed adjacent an upper end of the wheel, each upper arm being fixedly attached at a first end thereof to the hub, and at a second end thereof to a drive gear having downwardly-facing gear teeth, the set of lower arms being disposed adjacent a lower end of the wheel, each lower arm being fixedly attached at a first end thereof to the hub and at a second end thereof to a ring;
      ii. a plurality of vertical rods, each rod interconnecting an upper arm with a corresponding lower arm which is parallel to the upper arm, each rod having a blade pivotally attached thereto adjacent a first end of the blades;
      iii. a plurality of stops positioned on the wheel, each stop being movable between a first position in which contact with a blade is possible and a second position in which contact with a blade is not possible, the stops, when in contact with the blades, serving to prevent pivotal movement of the blades; and
   b. a platform adjacent the water wheel, the platform having a plurality of dynamos thereon, the dynamos having gears which mesh with the drive gear of the water wheel, the platform being positioned and shaped such that it does not, in plan, intersect the area occupied by the blades when the stops are in the second position.

4. The apparatus of claim 3, wherein the rods are positioned adjacent the ring and the platform partially surrounds the wheel, terminating on its downstream ends such that it does not extend above the area occupied by the blades when the stops are in the second position.

5. The apparatus of claim 3, wherein there are a plurality of rods between each upper arm and its corresponding lower arm, and the platform, in plan, completely surrounds the water wheel.

6. The apparatus of claim 3, further comprising means for removing the water wheel from a body of water.

7. The apparatus of claim 6, wherein the means for removing the water wheel from a body of water comprises:
   a pile extending vertically from below the body of water to a height above the high water level of the body of water at least equal to the vertical height of the water wheel; and
   a block and tackle means located adjacent an upper end of the pile.

8. The apparatus of claim 3, further comprising means for diverting debris away from the water wheel.

9. The apparatus of claim 8, wherein the means for diverting debris away from the water wheel comprises a net means stretch across a plurality of piles, at least one of the piles being located upstream of the water wheel.

10. A water-powered electricity generating apparatus, comprising:
   a. a water wheel having a plurality of blades;
   b. a plurality of stops which are movable between a position where contact with the blades is possible to a position where contact with the blades is not possible;
   c. a drive gear fixedly attached to the water wheel;
   d. a central platform coaxially aligned with and positioned adjacent the exterior of the water wheel, the platform having a plurality of electricity-generating device thereon, the devices having gears which mesh with the drive gear; and
   e. means for facilitating the removal of the water wheel from the water including downwardly facing teeth on the drive gear, such that the water wheel can be removed from the water without removing the platform or electricity-generating devices.

11. The apparatus of claim 10, wherein the drive gear meshes with the gears of the electricity-generating devices such that the water wheel can be removed from a body of water without moving the electricity-generating devices.

12. A water-powered electricity generating apparatus, comprising:
   a. a platform having a plurality of dynamos thereon, the dynamos having a gears;
   b. a water wheel adjacent and surrounding the platform, the water wheel comprising:
      i. a drive gear which meshes with the dynamo gears;
      ii. a set of upper arms radiating outwardly from the drive gear, said upper arms being fixedly attached at a first end thereof to the drive gear and at a second end to an upper, outer ring;
      iii. a lower inner ring;
      iv. a lower outer ring;
      v. a set of lower arms radiating outwardly from the lower, inner ring, said lower arms being fixedly attached at a first end thereof to the lower, inner ring and at a second end to the lower, outer ring;
      vii. a plurality of vertical inner rods, said inner rods being fixedly attached to an upper arm and fixedly attached adjacent the first end of a lower arm;
      viii. a plurality of vertical outer rods, said outer rods being fixedly attached adjacent the second end of an upper arm and the second end of a lower arm;
      ix. a plurality of blades, each vertical outer rod having said blades pivotally attached thereto adjacent a first end of the blade; and
      x. a plurality of stops positioned on the wheel, said stops being movable between a first position in which contact with said blades is possible and a second position in which contact with said blades is not possible, the stops, when in contact with the blades, serving to prevent pivotal movement of the blades.

13. The apparatus of claim 12, wherein the drive gear comprises downwardly-facing teeth.

14. The apparatus of claim 12, further comprising means for removing the water wheel from a body of water.

15. The apparatus of claim 12, further comprising means for diverting debris away from the water wheel.

* * * * *